(12) United States Patent
Kato et al.

(10) Patent No.: US 11,401,897 B2
(45) Date of Patent: Aug. 2, 2022

(54) INTAKE PIPE

(71) Applicant: AISAN KOGYO KABUSHIKI KAISHA, Obu (JP)

(72) Inventors: Yoshinobu Kato, Ichinomiya (JP); Takashi Bessho, Chiryu (JP)

(73) Assignee: Aisan Kogyo Kabushiki Kaisha, Obu (JP)

(*) Notice: Subject to any disclaimer, the term of this patent is extended or adjusted under 35 U.S.C. 154(b) by 0 days.

(21) Appl. No.: 17/471,322

(22) Filed: Sep. 10, 2021

(65) Prior Publication Data
US 2022/0082070 A1 Mar. 17, 2022

(30) Foreign Application Priority Data
Sep. 14, 2020 (JP) .............................. JP2020-153583

(51) Int. Cl.
*F02M 35/10* (2006.01)
*F02M 25/08* (2006.01)

(52) U.S. Cl.
CPC ...... *F02M 35/10222* (2013.01); *F02M 25/08* (2013.01); *F02M 35/10098* (2013.01)

(58) Field of Classification Search
CPC ....... F02M 35/10222; F02M 35/10098; F02M 35/10209; F02M 25/08; F02M 25/0872; F02M 25/0836
See application file for complete search history.

(56) References Cited

U.S. PATENT DOCUMENTS 10,760,534 B2   9/2020  Akiyama
2018/0112634 A1* 4/2018  Hoffman .......... F02M 35/10229

FOREIGN PATENT DOCUMENTS

| JP | 2017067043 A | 4/2017 |
| JP | 2018053808 A | 4/2018 |
| JP | 6549011 B2 | 7/2019 |

* cited by examiner

*Primary Examiner* — Jacob M Amick
(74) *Attorney, Agent, or Firm* — Conley Rose, P.C.

(57) ABSTRACT

An intake pipe includes a pipe body and an ejector part. The pipe body includes an intake passage therein. The ejector part includes an air inlet, a vapor inlet, and an outlet pipe part. The ejector part is configured to generate a negative pressure in response to a compressed air supplied from a compressor through the air inlet to suction fuel vapor generated in a fuel tank through the vapor inlet. The ejector part is configured to discharge a gaseous mixture of the compressed air and the fuel vapor into the intake passage via the outlet pipe part. The pipe body includes a passage wall part formed with the ejector part as a monolithic, single-piece. The passage wall part includes a recess open to the intake passage side. The outlet pipe part is disposed in the recess and extends in a discharge direction of the compressed air from the ejector part.

14 Claims, 8 Drawing Sheets

INTAKE PIPE

CROSS-REFERENCE TO RELATED APPLICATIONS

This application claims priority to Japanese patent application serial number 2020-153583, filed Sep. 14, 2020, which is incorporated herein by reference in its entirety for all purposes.

STATEMENT REGARDING FEDERALLY SPONSORED RESEARCH OR DEVELOPMENT

Not applicable.

BACKGROUND

This disclosure relates generally to intake pipes.

One type of intake pipe for an internal combustion engine with a compressor includes a pipe body and an ejector part. The pipe body defines an air intake passage therein. The ejector part is configured to generate negative pressure therein by using air supplied from the compressor to suction fuel vapor evaporated in a fuel tank. The ejector is also configured to discharge a gaseous mixture of the air and the fuel vapor into the air intake passage. The gaseous mixture is also referred to as a "purge gas."

SUMMARY

In one aspect of this disclosure, an intake pipe for an internal combustion engine having a compressor includes a pipe body defining an intake passage therein and an ejector part. The ejector part includes an air inlet, a vapor inlet, and an outlet pipe part, which are in fluid communication with each other. The ejector part is configured to generate a negative pressure due to a compressed air supplied from the compressor to the ejector part through the air inlet, to suction fuel vapor generated in a fuel tank through the vapor inlet due to the negative pressure, and to discharge a gaseous mixture of the compressed air and the fuel vapor into the intake passage via the outlet pipe part. The pipe body includes a passage wall part, which is formed with the ejector part as a single piece. The passage wall part includes a recess open to the intake passage side. The outlet pipe part is disposed in the recess and extends in a discharge direction of the compressed air from the ejector part.

In accordance with this aspect, the outlet pipe part of the ejector part is disposed in the recess of the passage wall part of the pipe body. Thus, disturbances to the flow of the intake air flowing in the intake passage can be decreased, thereby reducing pressure losses. Accordingly, the amount of intake air supplied to the internal combustion engine can be increased, so that power of the engine can be increased.

DETAILED DESCRIPTION

As described above, the ejector part is configured to generate negative pressure to suction fuel vapor evaporated from the fuel tank and discharge the purge gas (i.e., the gaseous mixture of air and the fuel vapor) into the air intake passage. Pressure losses within intake pipe can reduce the ability of the ejector part to suction the fuel vapor efficiently. Thus, there has been a need for improved intake pipes.

Japanese Laid-Open Patent Publication No. 2018-053808 discloses an intake pipe for an internal combustion engine with a compressor. The intake pipe includes a pipe body defining an air intake passage therein, and an ejector part configured to discharge fuel vapor into the air intake passage. In particular, the intake pipe includes a communication passage and a chamber. The communication passage is L-shaped between an outlet of the ejector part and the air intake passage. The chamber is shaped to increase a passage area at both the communication passage and a connection portion between the air intake passage and the communication passage. However, when intake air flows into the chamber and/or when air is swirled in the chamber, the flow of the intake air may be disturbed within the chamber. Accordingly, this may undesirably increase pressure losses.

Japanese Laid-Open Patent Publication No. 2017-067043 discloses an intake pipe including an ejector part. The intake pipe has an upstream passage part and a downstream passage part having a larger passage area than the upstream passage part. An outlet of the ejector part is positioned at a stepped part formed between the upstream passage part and the downstream passage part. The stepped part may partially disturb the flow of the intake air and/or may cause a swirl of the air, both of which undesirably increase pressure losses. Japanese Laid-Open Patent Publication No. 2017-067043 also discloses another intake pipe where a portion of the ejector part protrudes into the air intake passage. In that embodiment, the protruding portion of the ejector part may disturb the flow of the intake air, thereby undesirably increasing pressure losses.

Figure 1:
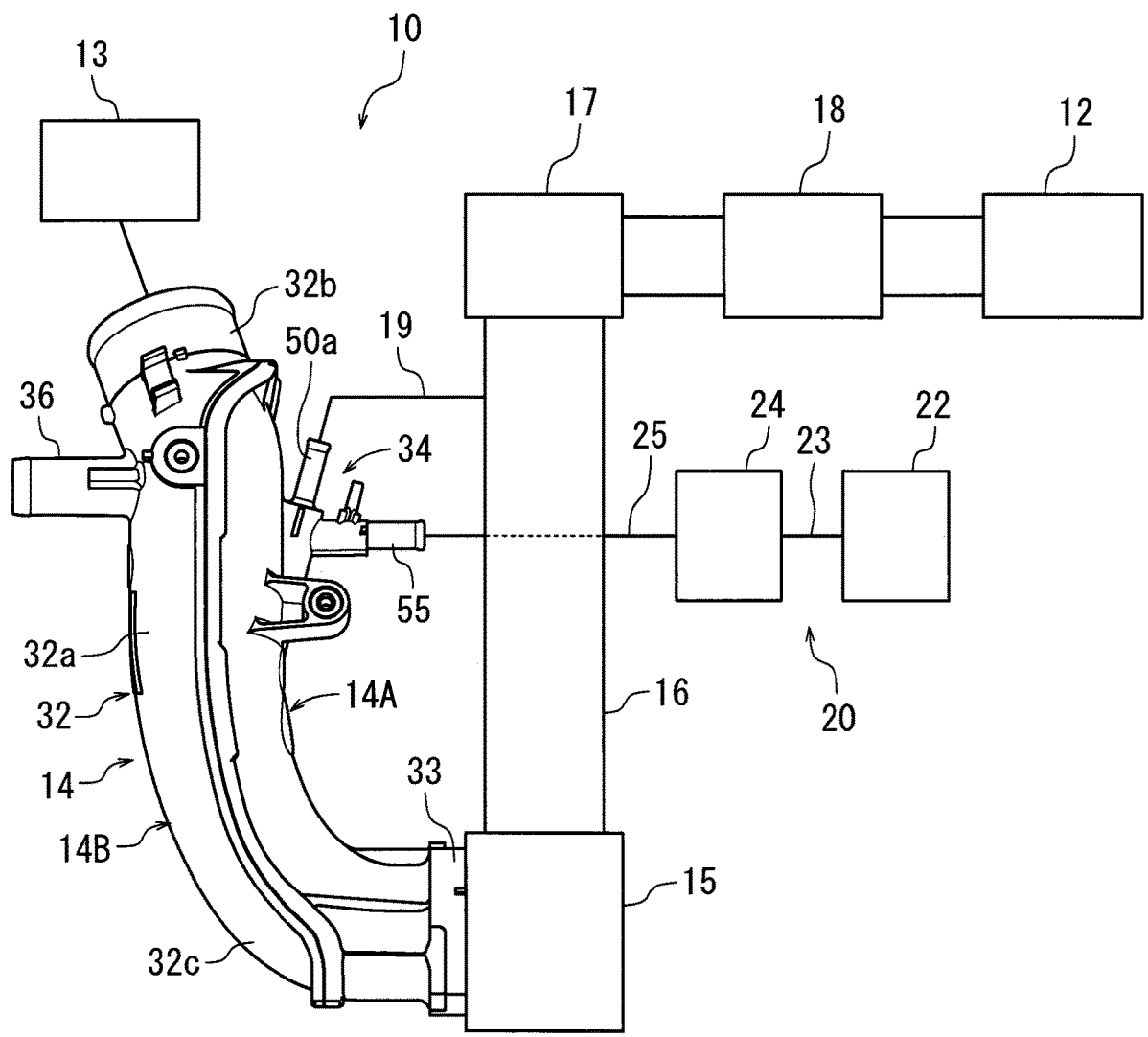
FIG. 1 is a schematic view of an embodiment of an internal combustion engine with a compressor according to the principles described herein.

A first embodiment of this disclosure will now be described with reference to the drawings. Referring now to FIG. 1, an intake pipe 14 according to the first embodiment is used for an internal combustion engine 12 (also referred to as an "engine") with a compressor 15. The engine 12 is mounted on a vehicle, such as an automobile.

As illustrated in FIG. 1, the internal combustion engine 12 with the compressor 15 includes an intake system 10 and a fuel purge system 20. The intake system 10 is configured to supply air to the engine 12, whereas the fuel purge system 20 is configured to supply fuel vapor evaporated in a fuel tank 22 to the intake system 10.

The intake system 10 includes an air cleaner 13, the intake pipe 14, the compressor 15, a communication pipe 16, a throttle device 17, and an intake manifold 18, which are in fluid communication with each other and successively coupled moving from an upstream end distal the engine 12 to a downstream end toward the engine 12. The intake manifold 18 is connected to the engine 12. In the intake system 10, air successively flows downstream through the air cleaner 13, the intake pipe 14, the compressor 15, the communication pipe 16, the throttle device 17, and the intake manifold 18, and then is introduced into the combustion chambers of the engine 12. The air is mixed with fuel and is burned in the combustion chambers of the engine 12, and then is discharged into an exhaust system (not shown).

The cleaner 13 is configured to filter air flowing into the intake system 10. The intake pipe 14 includes an ejector part 34. The compressor 15 may be a turbocharger, which includes a compressor device driven by a turbine powered by exhaust gas energy from the engine 12. The compressor 15 is configured to force air flowing through the air cleaner 13 and the intake pipe 14 into the combustion chambers of the engine 12. A return pipe 19 extending from the communication pipe 16 is connected to the ejector part 34 of the intake pipe 14, and provides fluid communication therebetween. The throttle device 17 includes an actuator and a throttle valve (not shown). The engine 12 and intake system 10 are controlled by an electronic control device (ECU). When the ECU controls the actuator of the throttle device 17, the opening degree of the throttle valve is regulated, so as to control the amount of the intake air forced into the engine 12.

The fuel vapor purge system 20 includes a fuel vapor pipe 23 and a canister 24 connected to the fuel tank 22 via the fuel vapor pipe 23. The canister 24 is filled with an adsorbent, such as activated carbon, configured to adsorb and desorb fuel vapor. The canister 24 is connected to and in fluid communication with the ejector part 34 of the intake pipe 14 via a purge pipe 25. In the fuel vapor purge system 20, fuel vapor evaporated in the fuel tank 22 flows into the canister 24 via the fuel vapor pipe 23, and then is adsorbed by the adsorbent in the canister 24. The fuel vapor in the canister 24 is released and drawn out due to negative pressure generated by the compressed air flow in the ejector part 34 and is discharged into the intake pipe 14.

The intake pipe 14 will now be described in more detail with reference to FIGS. 2 to 4. The intake pipe 14 will be described based on the orientation shown in FIG. 2, however, such orientation does not limit the mounting direction of the intake pipe 14. As illustrated in FIG. 3, the intake pipe 14 substantially has a cylindrical tubular shape and includes an intake passage 31 therein. The intake pipe 14 includes a pipe body 32 and the ejector part 34. The intake pipe 14, including the pipe body 32 and the ejector part 34, may be made of resin.

Figure 2:
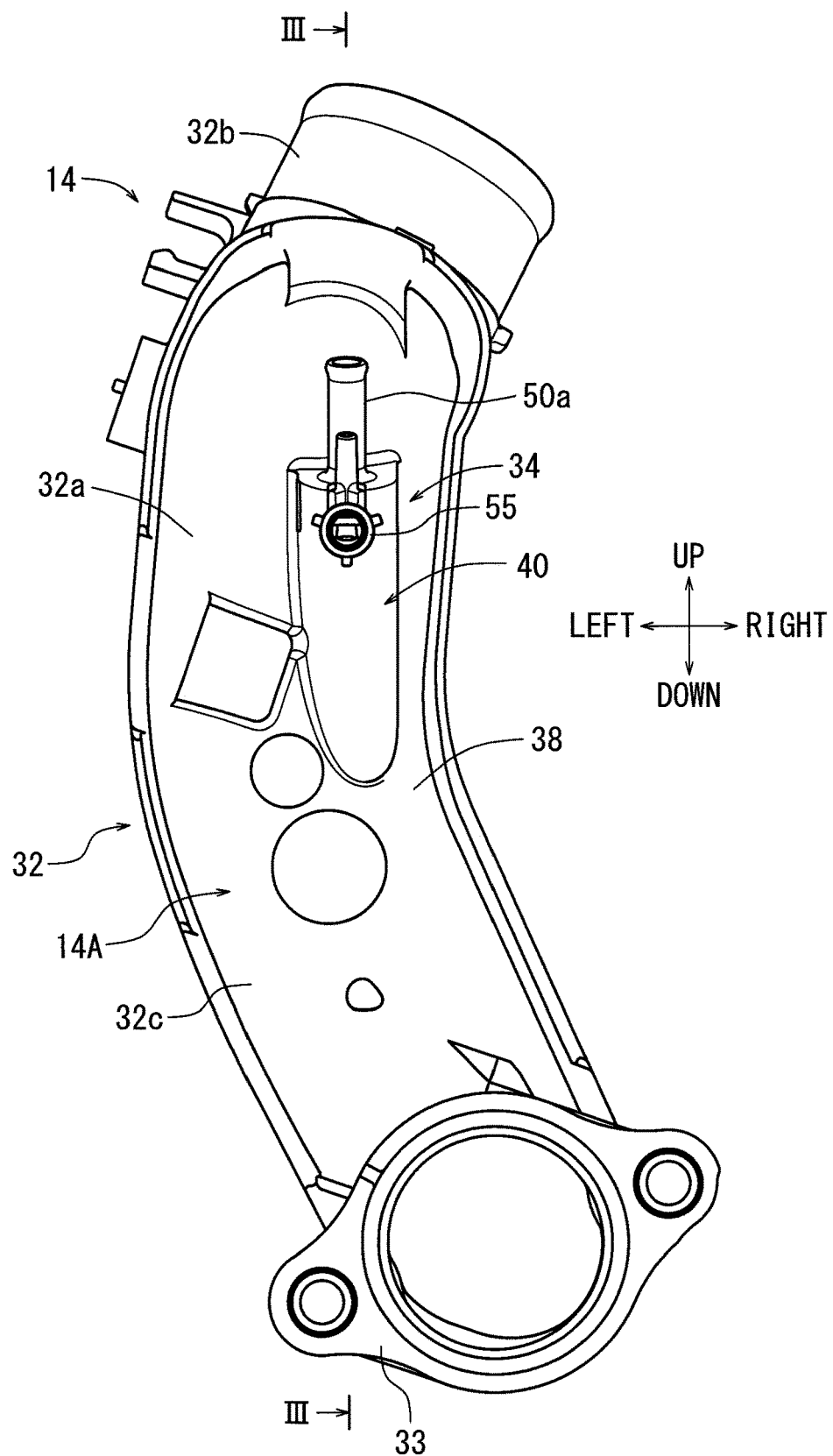
FIG. 2 is a front view of the intake pipe of the internal combustion engine of FIG. 1.
Figure 3:
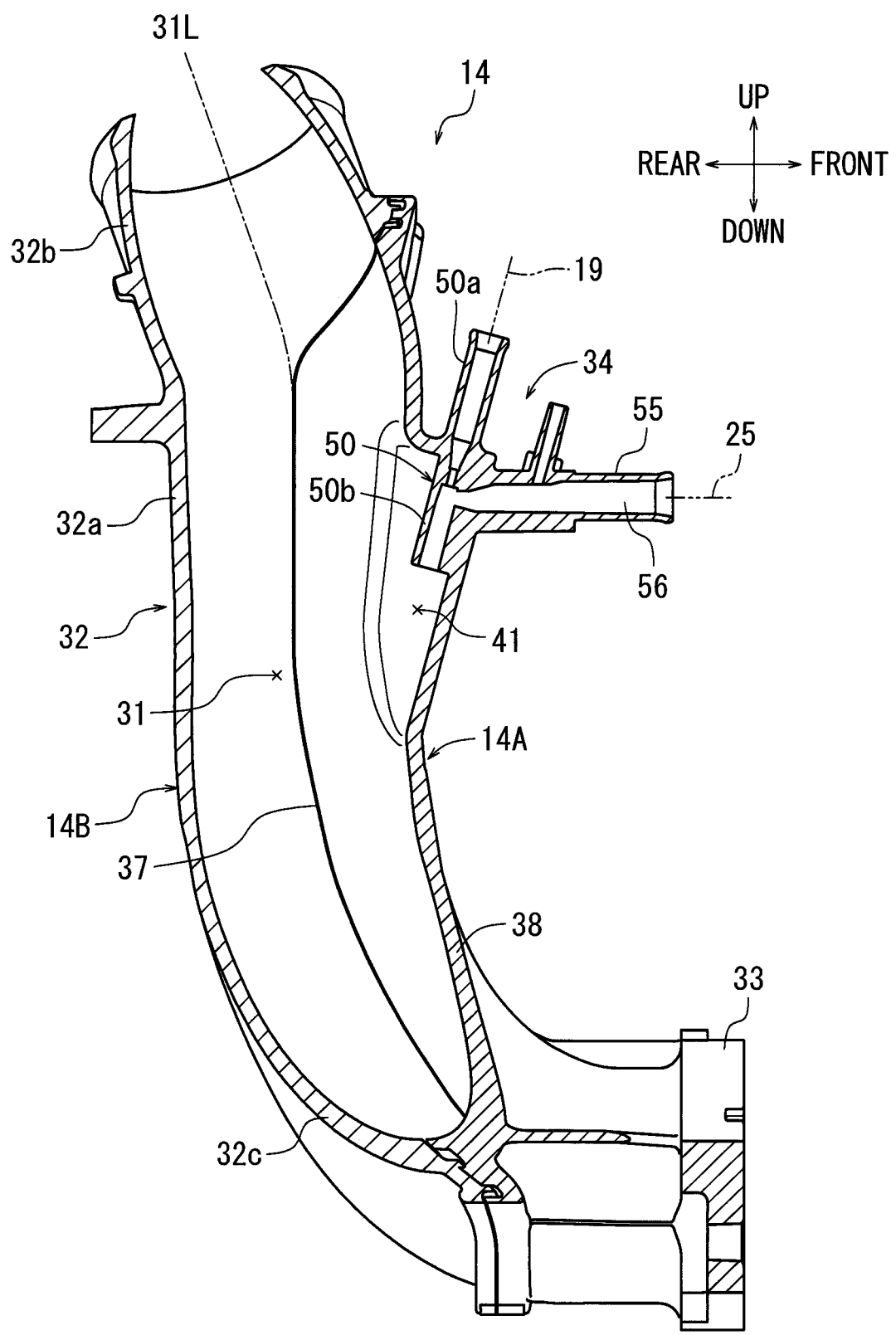
FIG. 3 is a cross-sectional view of the intake pipe of FIG. 2, taken along line III-III in FIG. 2.

As shown in FIG. 2, the pipe body 32 includes an upstream pipe part 32b defining the inlet of the intake pipe 14, a middle pipe part 32a, and a downstream pipe part 32c defining the outlet, which are successively arranged from the top (inlet) to the bottom (outlet). The middle pipe 32a is generally vertically oriented. The upstream pipe part 32b extends from the middle pipe part 32a obliquely upward and rightward to the rear. The upstream pipe part 32b is formed to be fitted with and connected to the air cleaner 13.

The downstream pipe part 32c has a curved tubular shape including an upper portion and a lower portion. The upper portion extends from the middle pipe part 32a obliquely downward and rightward to the front. The lower portion extends downward from the upper portion and has an L-shape bent forward. The downstream pipe part 32c includes a flange 33 protruding radially outward from the downstream end of the downstream pipe part 32c. The flange 33 is formed and configured to be connected to the compressor 15 by fastening.

As illustrated in FIG. 2, the ejector part 34 is molded with the middle pipe part 32a as a monolithic, single-piece and is placed to the right from the center of a front portion of the middle pipe part 32a. As shown in FIG. 4, a cylindrical connection port 36 protrudes rearward from the center of a rear portion of the middle pipe part 32a. The connection port 36 is formed and configured to be connected to an air bypass valve (not shown) configured to control the amount of the intake air flowing through the intake passage 31.

Figure 4:
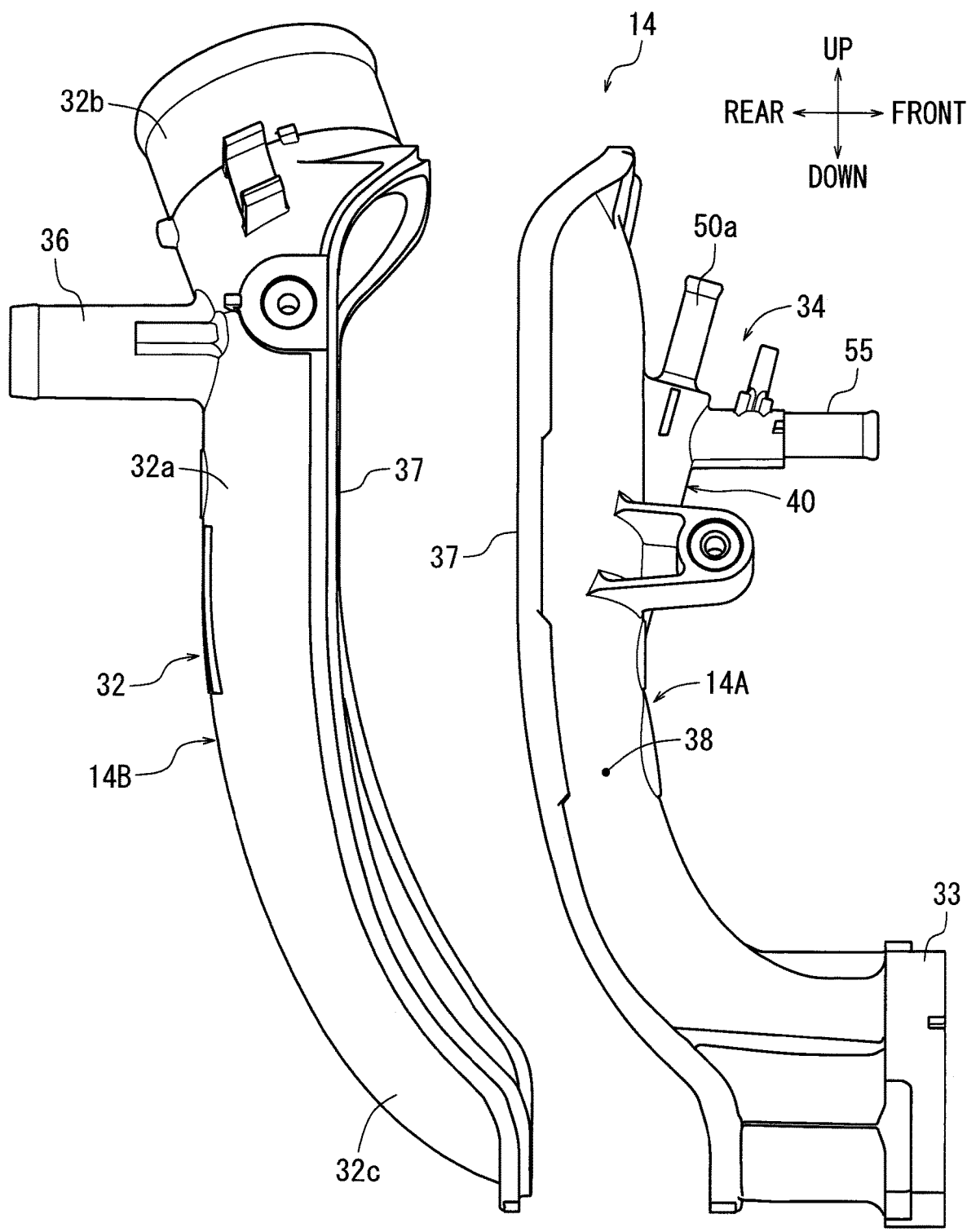
FIG. 4 is a left side view of the intake pipe of FIG. 2 in a disassembled state.

As shown in FIG. 4, the intake pipe 14 includes a first portion or half 14A and a second portion or half 14B that are separately formed and then joined to each other by vibration welding or the like to form the intake pipe 14. The first half 14A forms a front part of the intake pipe 14, and the second half 14B forms a rear part of the intake pipe 14. Each of the first half 14A and the second half 14B may be made of resin and may be integrally molded by injection molding.

As illustrated in FIGS. 3 and 4, a parting surface 37, which is defined by a bonding surface between the first half 14A and the second half 14B, substantially extends along a center line 31L of the intake passage 31 at a central part of the pipe body 32. Accordingly, as shown in FIG. 4, the ejector part 34 is formed on the first half 14A and the connection port 36 is formed on the second half 14B.

As illustrated in FIG. 3, an upper end part of the parting surface 37 extends from an upper end of the middle pipe part 32a of the pipe body 32 obliquely upward to the front. Thus, as shown in FIG. 4, most of the upstream pipe part 32b is formed on the second half 14B. As illustrated in FIG. 3, a lower end part of the parting surface 37 extends downward from a position close to the center of the downstream pipe part 32c of the pipe body 32. Thus, as shown in FIG. 4, a downstream end part including the flange 33 of the downstream pipe part 32c is formed on the first half 14A. The first half 14A includes a passage wall part 38 at least partially defining the intake passage 31.

Figure 6:
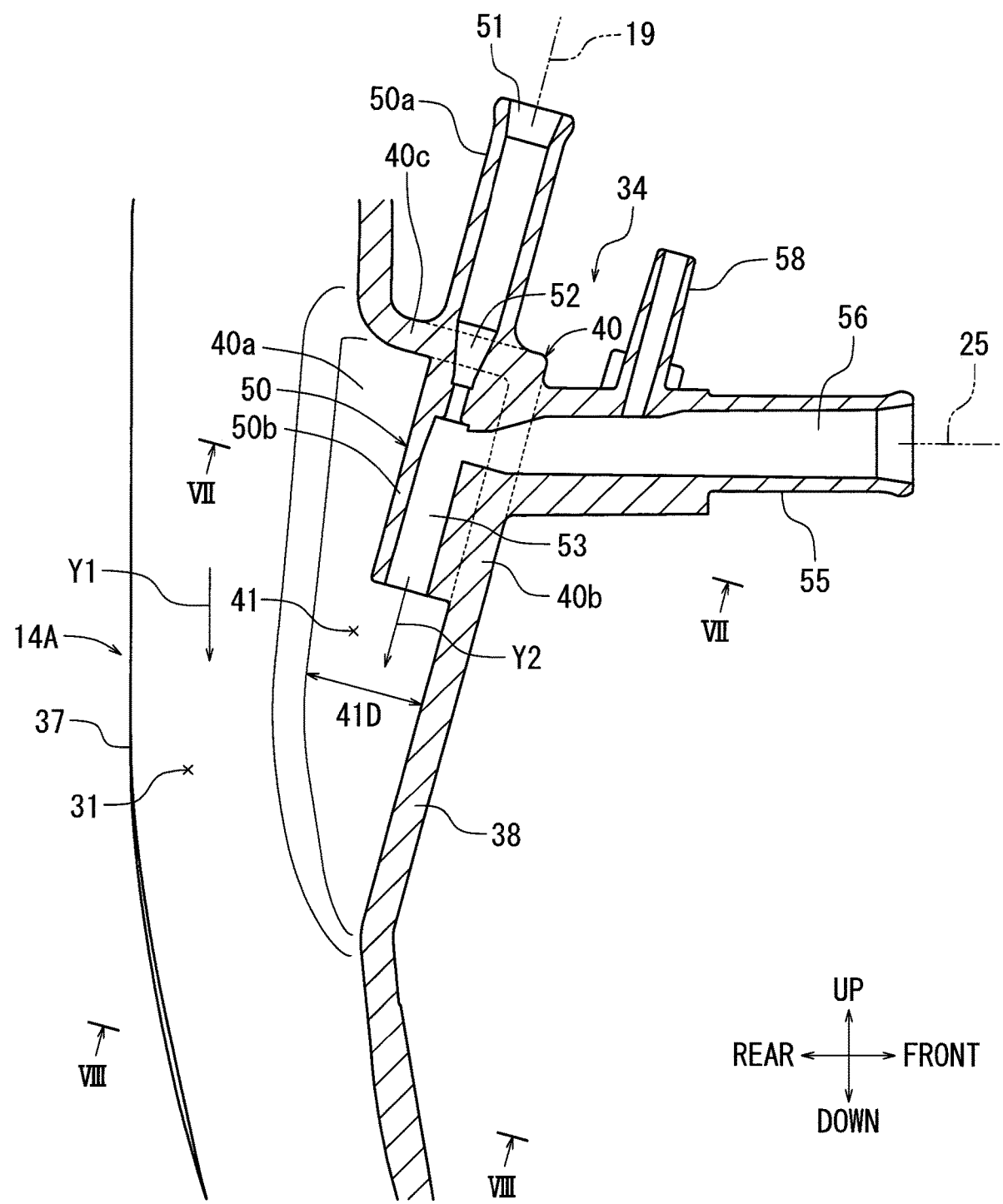
FIG. 6 is an enlarged cross-sectional view of the first half of the intake pipe of FIG. 5, taken along line VI-VI in FIG. 5.

As shown in FIG. 6, a protruding or swelling part 40 is integrally molded with the passage wall part 38 of the first half 14A. The swelling part 40 has a front part projecting to the front, and a rear recess open to the intake passage 31 side.

Figure 7:
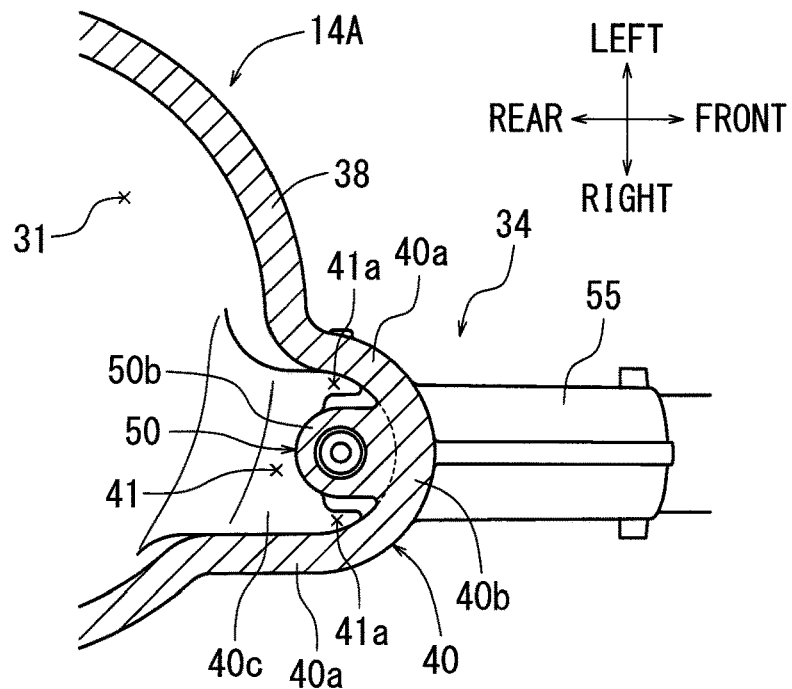
FIG. 7 is an enlarged cross-sectional view of the first half of the intake pipe of FIG. 6, taken along line VI-VI in FIG. 6.
Figure 8:
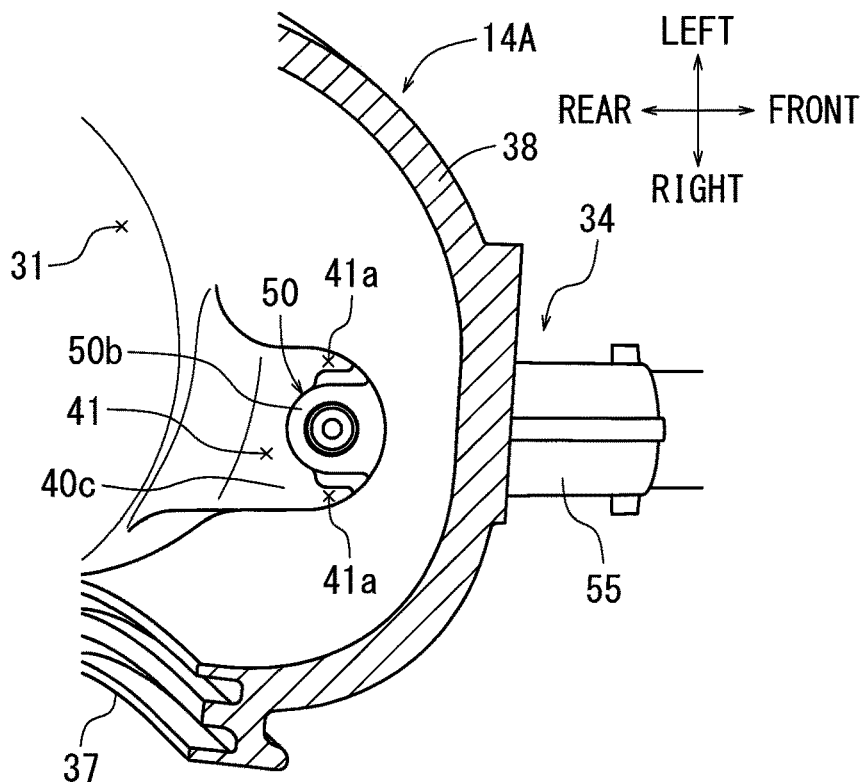
FIG. 8 is an enlarged cross-sectional view of the first half of the intake pipe of FIG. 6, taken along line VIII-VIII in FIG. 6.

As illustrated in FIGS. 6 and 7, the swelling part 40 includes right and left side wall parts 40a, a front wall part 40b, and an upper wall part 40c. The front wall part 40b may have a semi-cylindrical shape extending between front edges of the side wall parts 40a. The upper wall part 40c may have a plate shape with a U-shaped edge extending along upper ends of the side wall parts 40a and that of the front wall part 40b. The upper wall part 40c may extend perpendicular to the front wall part 40b. The swelling part defines a vertically extending groove 41 open to the intake passage 31. The groove 41 may also be referred to herein as a "recess" along the intake passage 31. The front wall part 40b forms a bottom of the groove 41, and thus, also may be referred to herein as the "groove bottom part."

Figure 5:
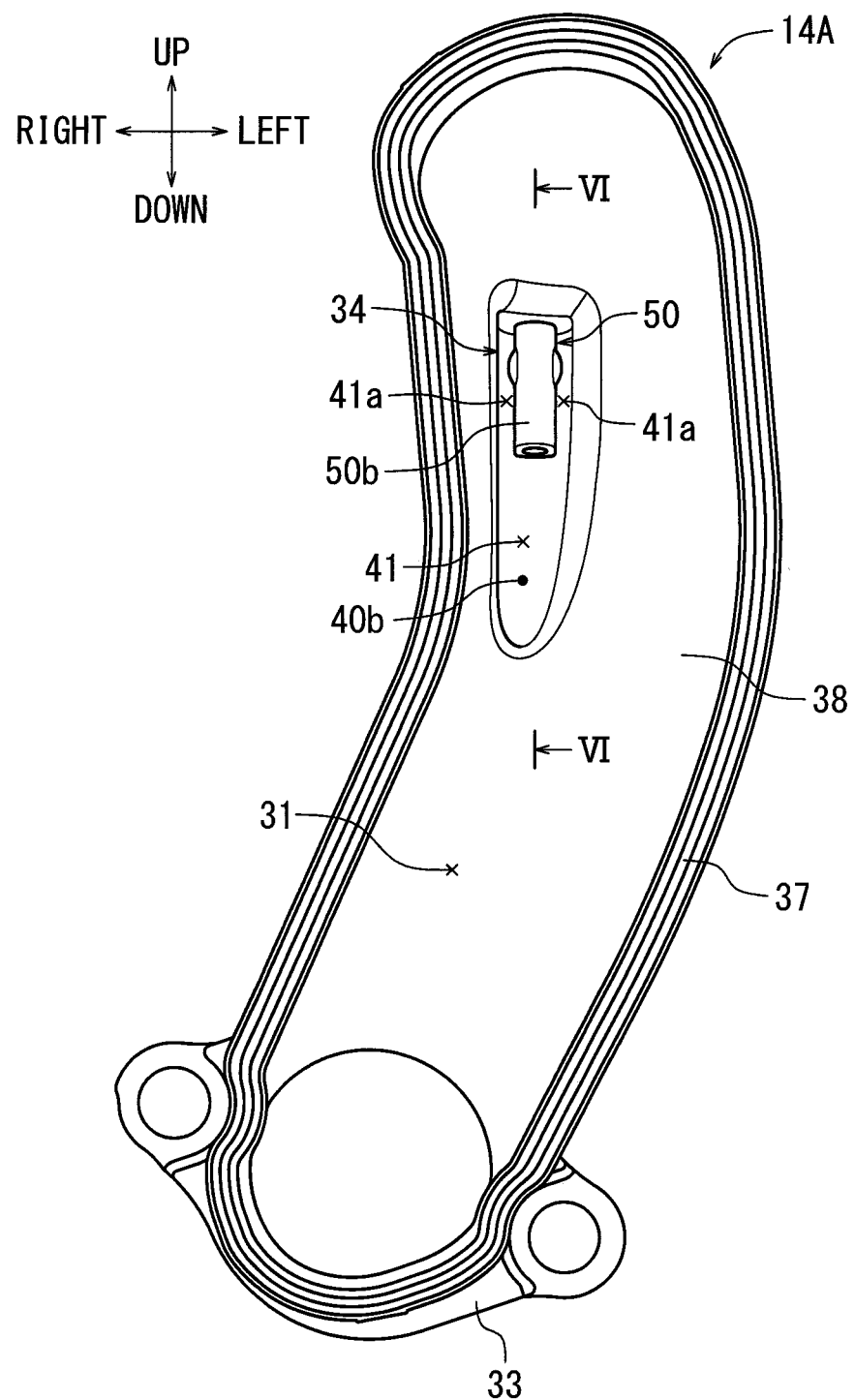
FIG. 5 is a rear view of a first half of the intake pipe of FIG. 4.

As illustrated in FIG. 6, the groove bottom part 40b has a groove depth 41D measured perpendicularly from the groove bottom part 40b to the intake passage 31. The groove depth 41D gradually decreases moving from the upper upstream side to the lower downstream side. As shown in FIG. 5, the groove 41 is formed at a position to the right from the center of the passage wall part 38 of the first half 14A.

Thus, as illustrated in FIG. 7, the groove depth 41D on the right side of the groove 41 is deeper than that on the left side of the groove 41.

As illustrated in FIG. 6, the ejector part 34 may be integrally molded with the air intake pipe 14 at a corner between the groove bottom part 40b and the upper wall part 40c of the swelling part 40. The ejector part 34 includes an ejector housing 50 that has a substantially cylindrical tubular shape extending in a direction where compressed air is to be discharged as shown by arrow Y2 in FIG. 6. It is to be understood that the "direction along where compressed air is to be discharged" corresponds to a direction along which the gaseous mixture of compressed air and fuel vapor is discharged. The central part of the ejector housing 50 in the axial direction is shaped to be continuous with the upper wall part 40c of the swelling part 40 such that the central part is oriented perpendicular to the upper wall part 40c.

The ejector housing 50 includes a compressed air inlet pipe part 50a and an outlet pipe part 50b, which are coaxially aligned. The compressed air inlet pipe part 50a extends upward from the upper wall part 40c of the swelling part 40. The outlet pipe part 50b extends downward from the upper wall part 40c of the swelling part 40 and into the groove 41.

The outlet pipe part 50b is formed to be continuous with the groove bottom part 40b of the swelling part 40, such that a front edge of the outlet pipe part 50b extends along an upstream half of the groove bottom part 40b of the swelling part 40. Accordingly, the outlet pipe part 50b of the ejector housing 50 is disposed in a lower portion of the groove 41. As shown in FIGS. 5 and 7, a pair of right and left side groove parts 41a are formed between the outlet pipe part 50b and the side wall parts 40a of the swelling part 40. Each of the side groove parts 41a corresponds to a portion of the groove 41. So, the outlet pipe part 50b, except the front edge part thereof, is surrounded by the groove 41, including the side groove parts 41a. The outlet pipe part 50b is entirely disposed in the groove 41.

As shown in FIG. 3, the downstream pipe part 32c of the pipe body 32 is bent at the bottom of the groove 41 toward the ejector part 34 (i.e., forward). Accordingly, the downstream pipe part 32c may also be referred to herein as a "bent pipe part."

As shown in FIG. 6, the ejector housing 50 defines therein a compressed air inlet passage 51, a nozzle passage 52, and a diffuser passage 53, which are successively arranged and coaxially aligned from an upper end to a lower end of the ejector housing 50. As shown in FIG. 1, the compressed air inlet pipe part 50a is connected to the communication pipe 16 of the intake system 10 of the engine 12 via the return pipe 19.

As shown in FIG. 6, the ejector housing 50 is disposed such that a direction of the compressed air discharged from the ejector housing 50, as indicated by arrow Y2, is oriented at an acute angle relative to a direction of intake air flowing through the intake passage 31, as indicated by arrow Y1, in the vicinity of the groove 41.

A fuel vapor suction pipe 55 has a hollow cylindrical shape protruding forward from an upper end of the groove bottom part 40b of the swelling part 40. The fuel vapor suction pipe 55 defines a fuel vapor suction passage 56 therein. The fuel vapor suction passage 56 is in fluid communication with an upstream end of the diffuser passage 53. As shown in FIG. 1, the fuel vapor suction pipe 55 is connected to the canister 24 of the fuel vapor purge system 20 of the engine 12 via the purge pipe 25.

A pressure sensor connection port 58 has a hollow cylindrical shape protruding upward from the middle portion of the fuel vapor suction pipe 55. The pressure sensor connection port 58 is shaped and configured to be connected to a pressure sensor (not shown) that measures the pressure within the fuel vapor suction passage 56. The pressure sensor connection port 58 is oriented parallel to the compressed air inlet pipe part 50a.

While the engine 12 is running, the air compressed by the compressor 15 is applied from the communication pipe 16 to the compressed air inlet passage 51 of the ejector part 34 via the return pipe 19. The flow of the compressed air from the nozzle passage 52 of the ejector part 34 to the diffuser passage 53 generates a negative pressure in the ejector part 34, so that the fuel vapor is suctioned from the canister 24 to the fuel vapor suction passage 56 via the purge pipe 25 in response to the negative pressure. The fuel vapor is mixes with the compressed air, and is discharged from the diffuser passage 53 into the intake passage 31 via the groove 41. In this way, the fuel vapor is purged from the canister 24.

The outlet pipe part 50b of the ejector housing 50 extending in the discharge direction of the compressed air from the ejector part 34 is disposed in the groove 41 formed at the passage wall part 38 of the pipe body 32. Accordingly, in comparison with the conventional intake pipes disclosed in Japanese Laid-Open Patent Publications No. 2018-053808 and No. 2017-067043, disturbance of the flow of the intake air can be reduced, thereby decreasing pressure loss. Therefore, the amount of the intake air supplied to the engine 12 can be increased, so that power of the engine 12 can be increased.

The outlet pipe part 50b of the ejector housing 50 is formed such that the direction of the compressed air discharged from the ejector housing 50, as shown by arrow Y2 in FIG. 6, forms an acute angle with the direction of intake air flowing in the intake passage 31, as shown by arrow Y1 in FIG. 6, in the vicinity of the groove 41. Thus, in comparison with, for example, a case where the direction of the compressed air discharged from the ejector housing 50 is perpendicular to the direction of intake air flowing in the intake passage 31, the flow of the purge gas, i.e. the mixture of the compressed air and the fuel vapor, discharged from the outlet pipe part 50b, as shown by arrow Y2 in FIG. 6, can flow smoothly into and with the flow of the intake air flowing in the intake passage 31, as shown by arrow Y1 in FIG. 6.

The groove bottom part 40b is formed such that the groove depth 41D gradually decreases from the upstream side to the downstream side of the intake passage 31. The outlet pipe part 50b is disposed along the groove bottom part 40b. Thus, a mold removal direction for shaping the groove 41, including the groove bottom part 40b, of the passage wall part 38 of the pipe body 32 can be same as a mold removal direction for shaping the outlet pipe part 50b of the ejector housing 50. Accordingly, the structure of the mold for shaping the ejector part 34 can be simplified.

The pipe body 32 includes the downstream pipe part 32c curved toward the ejector part side. The downstream pipe part 32c is at a downstream side of the groove 41. Thus, the purge gas discharged from the outlet pipe part 50b of the ejector housing 50 joins with the intake air flowing through a front portion of the intake passage 31 and through a rear portion of intake passage 31, in turn. This allows the purge gas to efficiently mix with the intake air flowing in the intake passage 31. In contrast, if a downstream pipe part of the pipe body 32 were to be bent toward the opposite side of the ejector part, the intake air would flow through the downstream pipe part in a direction away from the ejector part side, and thus, would be difficult to join the purge gas with the intake air flow, thereby reducing the mixing efficiency between the intake air and the purge gas. However, since the pipe body 32 in this embodiment has the downstream pipe part 32c bent toward the ejector part side, the purge gas easily join with the intake air flow, thereby improving the mixing efficiency between the intake air and the purge gas. Further, restrictions for removal of the mold shaping the ejector part 34 can be reduced, and the structure of the mold for the ejector part 34 can be simplified.

The pipe body 32 is formed by joining the first half 14A and the second half 14B together along the parting surface 37 generally extending in the lengthwise direction. The first half 14A, including the ejector part 34 and the groove 41 is formed as monolithic, single-piece. Accordingly, in comparison with a case where the intake pipe 14 including the ejector part 34 is composed of three or more pieces, the number of components and production man-hours can be reduced, thereby reducing manufacture costs.

As noted above, the first half 14A including the ejector part 34 is formed as one piece. Thus, leakage of the intake air cannot occur between the first half 14A and the ejector part 34. In contrast, if a separate ejector were to be adhered to the first half 14A or to be attached to the first half 14A by a fastening member, maintaining a proper seal therebetween may be less certain. Further, in comparison with a case where an ejector is formed as a separate member, the number of components and production man-hours can be reduced, thereby reducing manufacture costs.

The outlet pipe part 50b, except the front edge part thereof that is integral with the wall part 38, is surrounded by the groove 41, including the side groove parts 41a, so that the structure of the mold used for shaping the ejector part 34 can be simplified.

Figure 9:
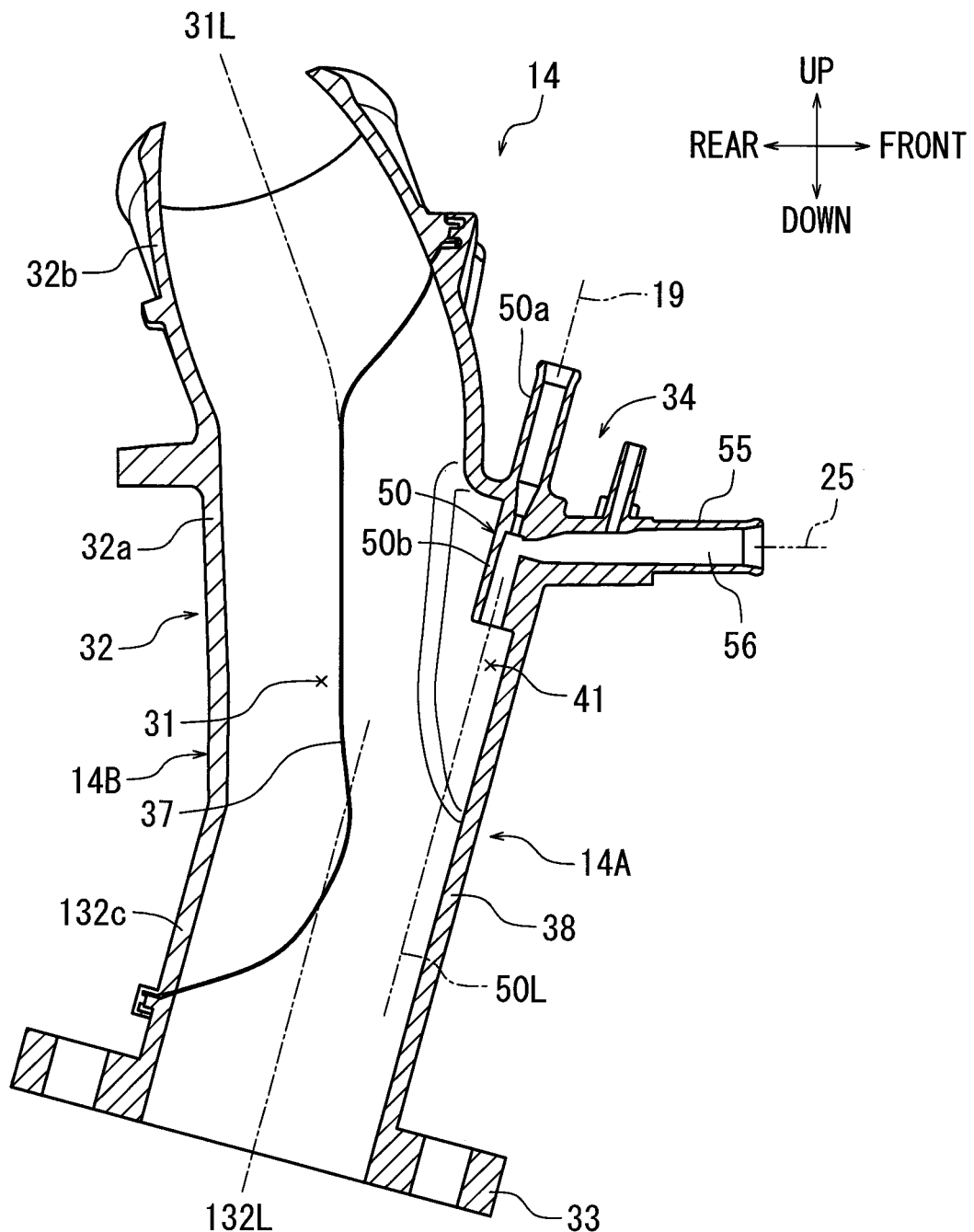
FIG. 9 is a cross-sectional view of an embodiment of an intake pipe according to the principles described herein.

A second embodiment will now be described. The second embodiment is similar to the first embodiment with some changes to the intake pipe 14. Thus, the changes will be described, and the same or similar configurations will not be described with the understanding they are the same as described in connection with the first embodiment. For purposes of clarity and further explanation, changed components of the second embodiment are labelled with numbers over one-hundred (100). As shown in FIG. 9, the intake pipe 14 includes a straight pipe part 132c extending linearly downward, instead of the downstream pipe part 32c of the pipe body 32. A center line 132L of the straight pipe part 132c is oriented parallel to a center line 50L of the outlet pipe part 50b of the ejector housing 50. A lower end part of the parting surface 37 between the first half 14A and the second half 14B extends from a position close to a center of the straight pipe part 132c of the pipe body 32 obliquely downward toward the rear. Thus, the first half 14A includes the flange 33 of the straight pipe part 132c.

In accordance with the second embodiment, the purge gas is discharged from the outlet pipe part 50b of the ejector housing 50 in a direction oriented parallel to the intake air flowing in the straight pipe part 132c. Accordingly, the purge gas can be efficiently mixed with the intake air flowing through the straight pipe part 132c.

The center line 132L of the straight pipe part 132c may be disposed coaxially with the center line 50L of the outlet pipe part 50b of the ejector housing 50. In this configuration, the purge gas is discharged from the outlet pipe part 50b of the ejector housing 50 in a direction that is coaxially aligned with the intake air flowing through the straight pipe part 132c. Accordingly, the purge gas can be efficiently mixed with the intake air flowing through the intake passage 31.

In the second embodiment, the first half 14A, including the flange 33, is formed as a monolithic, single-piece. However, the parting surface 37 may be changed such that the second half 14B includes the flange 33 and is formed as one piece.

The various examples described above in detail with reference to the attached drawings are intended to be representative of the present disclosure and are thus non limiting embodiments. The detailed description is intended to teach a person of skill in the art to make, use, and/or practice various aspects of the present teachings and thus does not limit the scope of the disclosure in any manner. Furthermore, each of the additional features and teachings disclosed above may be applied and/or used separately or with other features and teachings in any combination thereof, to provide improved intake pipe, and/or methods of making and using the same.

Further, various modifications of the present disclosure can be carried out. For example, the compressor 15 may be a supercharger, an electric turbocharger, or the like, instead of the turbocharger. The compressed air discharge direction of the outlet pipe part 50b of the ejector housing 50 may be directed in any direction. The shape of the recess may be changed into any shape capable of housing the outlet pipe part 50b. For example, the recess may be shaped to surround the entire circumference of the outlet pipe part 50b. An outlet end of the outlet pipe part 50b may project into the intake passage 31. Although the compressed air inlet pipe part 50a of the ejector housing 50 of the ejector part 34 is coaxially aligned with the outlet pipe part 50b in the above described embodiments, the compressed air inlet pipe part 50a and the outlet pipe part 50b may be aligned along a bent line.

What is claimed is:

1. An intake pipe for an internal combustion engine including a compressor, the intake pipe comprising:
   a pipe body including an intake passage therein, wherein the pipe body includes a passage wall part, and a recess extending from the passage wall part that is open to the intake passage;
   wherein the recess includes:
      a front wall;
      a plurality of side walls extending between the passage wall part and the front wall; and
      a depth extending from the intake passage to the front wall, wherein the depth gradually decreases toward a downstream side of the recess so that the front wall smoothly transitions into the passage wall part; and
   an ejector part including an air inlet, a vapor inlet, and an outlet pipe part in communication with each other, wherein the air inlet and the outlet pipe part are aligned along a common axis;
   wherein the ejector part is configured to generate a negative pressure in response to a flow of a compressed air supplied from the compressor to the ejector part through the air inlet,
   wherein the ejector part is configured to suction fuel vapor in a fuel tank through the vapor inlet in response to the negative pressure,
   wherein the ejector part is configured to discharge a mixture of the compressed air and the fuel vapor into the intake passage via the outlet pipe part;
   wherein the passage wall part is formed with the ejector part as a monolithic, single-piece; and
   wherein the outlet pipe part is disposed in the recess and extends in a discharge direction of the mixture from the ejector part.

2. The intake pipe of claim 1, wherein the outlet pipe part is positioned such that the discharge direction of the mixture is oriented at an acute angle with a flow direction of an intake air in the intake passage.

3. The intake pipe of claim 1, wherein the outlet pipe part is disposed along the front wall.

4. The intake pipe of claim 1, wherein the pipe body includes a bent pipe part bent toward an ejector part side, wherein the bent pipe part is disposed at a downstream side of the recess.

5. The intake pipe of claim 1, wherein the pipe body includes a straight pipe part disposed downstream of the recess such that a center line of the straight pipe part is oriented parallel to or coaxially aligned with a center line of the outlet pipe part.

6. The intake pipe of claim 1,
wherein the pipe body comprises a first half and a second half coupled along a parting surface primarily extending in a lengthwise direction of the pipe body;
wherein the first half includes the ejector part and the recess; and
wherein the first half is formed as a single-piece.

7. The intake pipe of claim 1, wherein the passage wall part has an opening in which the recess is formed.

8. An intake pipe for an internal combustion engine including a compressor, the intake pipe comprising:
a pipe body including an intake passage therein, wherein the pipe body includes a passage wall part, and a recess extending from the passage wall part that is open to the intake passage; and
an ejector part including an air inlet, a vapor inlet, and an outlet pipe part in communication with each other, wherein the air inlet and the outlet pipe part are aligned along a common axis;
wherein the ejector part is configured to generate a negative pressure in response to a flow of a compressed air supplied from the compressor to the ejector part through the air inlet,
wherein the ejector part is configured to suction fuel vapor in a fuel tank through the vapor inlet in response to the negative pressure,
wherein the ejector part is configured to discharge a mixture of the compressed air and the fuel vapor into the intake passage via the outlet pipe part;
wherein the passage wall part is formed with the ejector part as a monolithic, single-piece; and
wherein the outlet pipe part is disposed in the recess and extends in a discharge direction of the mixture from the ejector part.

9. The intake pipe of claim 8, wherein the outlet pipe part is positioned such that the discharge direction of the mixture is oriented at an acute angle with a flow direction of an intake air in the intake passage.

10. The intake pipe of claim 8,
wherein the recess includes a front wall positioned such that a depth of the recess measured perpendicularly from the front wall to the intake passage gradually decreases moving from an upstream side toward a downstream side of the intake passage; and
wherein the outlet pipe part is disposed along the front wall.

11. The intake pipe of claim 8, wherein the pipe body includes a bent pipe part bent toward an ejector part side, wherein the bent pipe part is disposed at a downstream side of the recess.

12. The intake pipe of claim 8, wherein the pipe body includes a straight pipe part disposed downstream of the recess such that a center line of the straight pipe part is oriented parallel to or coaxially aligned with a center line of the outlet pipe part.

13. The intake pipe of claim 8,
wherein the pipe body comprises a first half and a second half coupled along a parting surface primarily extending in a lengthwise direction of the pipe body;
wherein the first half includes the ejector part and the recess; and
wherein the first half is formed as a single-piece.

14. The intake pipe of claim 8, wherein the passage wall part has an opening in which the recess is formed.

* * * * *